June 16, 1953 — A. G. THORP II — 2,642,263
BLADE APPARATUS
Filed Jan. 5, 1951 — 2 Sheets-Sheet 1
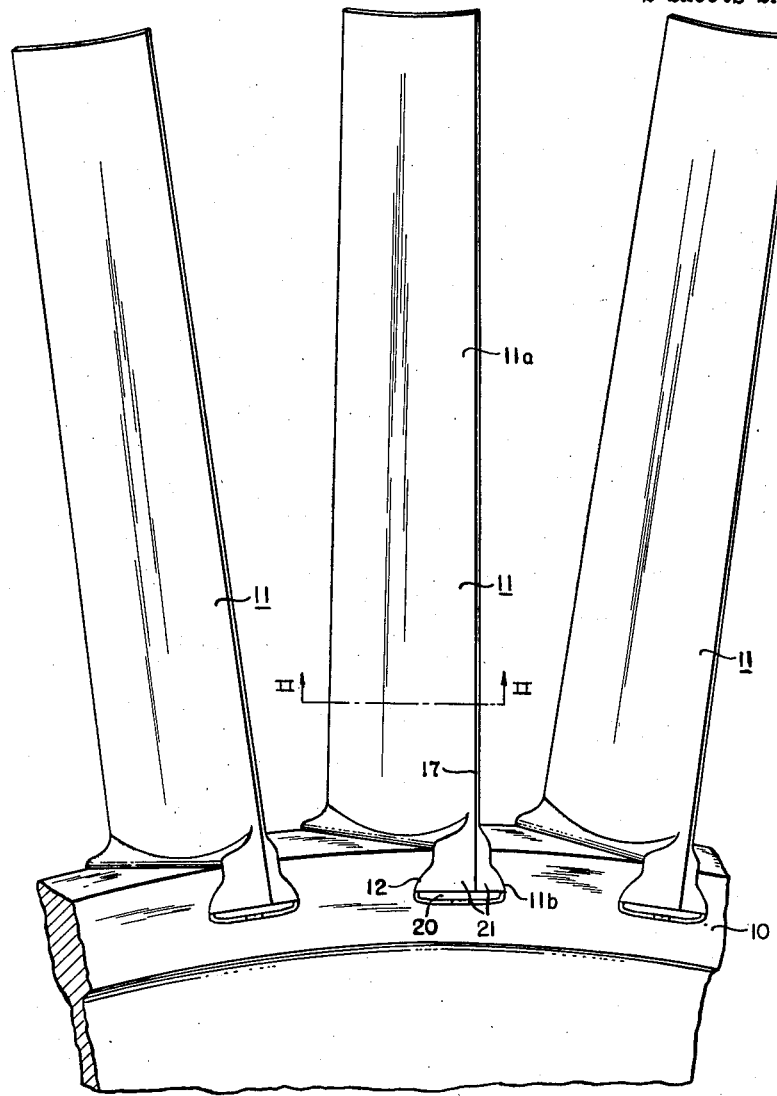
FIG. 1.
FIG. 2.
WITNESSES:
E. H. Lutz
A. Chawaja
INVENTOR
ARTHUR G. THORP, II
BY
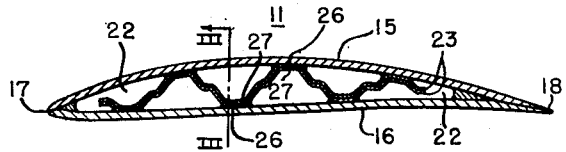
ATTORNEY June 16, 1953 — A. G. THORP II — 2,642,263
BLADE APPARATUS Filed Jan. 5, 1951 — 2 Sheets-Sheet 2

WITNESSES:
E. H. Lutz
A. Chavaga

INVENTOR
ARTHUR G. THORP, II
BY
Ralph T. French
ATTORNEY

Patented June 16, 1953

2,642,263

UNITED STATES PATENT OFFICE 2,642,263

BLADE APPARATUS

Arthur G. Thorp II, Swarthmore, Pa., assignor to Westinghouse Electric Corporation, East Pittsburgh, Pa., a corporation of Pennsylvania Application January 5, 1951, Serial No. 204,504

5 Claims. (Cl. 253—77)

This invention relates to blading for axial flow elastic fluid apparatus; for example, axial flow compressors, turbines, etc., and has for an object the provision of an improved light weight blade of the fabricated type.

A further object of the invention is to provide a blade of this character which is adapted to be employed in aviation gas turbine apparatus, and which has structural features for minimizing blade vibration and preserving blade contour.

Another object of the invention is the provision of an improved blade for an axial flow compressor, constituting a unitary fabricated structure and comprising spaced walls enclosing a plurality of slidably engaged interior damper elements mounted between the walls to reduce vibratory stresses.

It is also an object of the invention to provide a fabricated blade for elastic fluid apparatus, having a hollow body comprising complementary halves or shell elements which are formed about and jointly secured to an interior damper structure, the seams of the body being continuous along the leading and trailing edges thereof from root to tip, so that vibratory stresses will be uniformly distributed.

These and other objects are effected by the invention as will be apparent from the following description and claims taken in connection with the accompanying drawings, forming a part of this application, in which:

Fig. 1 is a fragmentary perspective view of several blades embodying the invention and mounted on a rotor disc;

Fig. 2 is an enlarged detail sectional view taken along the line II—II of Fig. 1;

Figure 4:
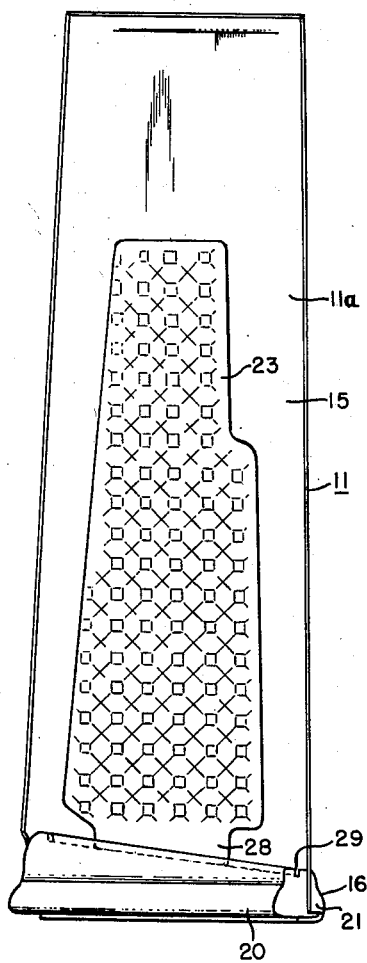
Fig. 4 is an elevational view of one of the blades with one of the halves removed.

Referring to Fig. 1 of the drawings, a typical disc 10 carrying blade units 11 is illustrated, constituting one stage of an axial flow compressor of the class adapted for use in an aviation gas turbine or turbojet power plant (not shown). Each of the blade units 11 may be of conventional outward form, comprising a blade portion 11a of suitably warped airfoil contour, and an enlarged root portion 11b which is adapted to be slidably engaged and suitably anchored in one of a plurality of mounting grooves 12 formed in the rim of the rotor disc 10.

Figure 3:
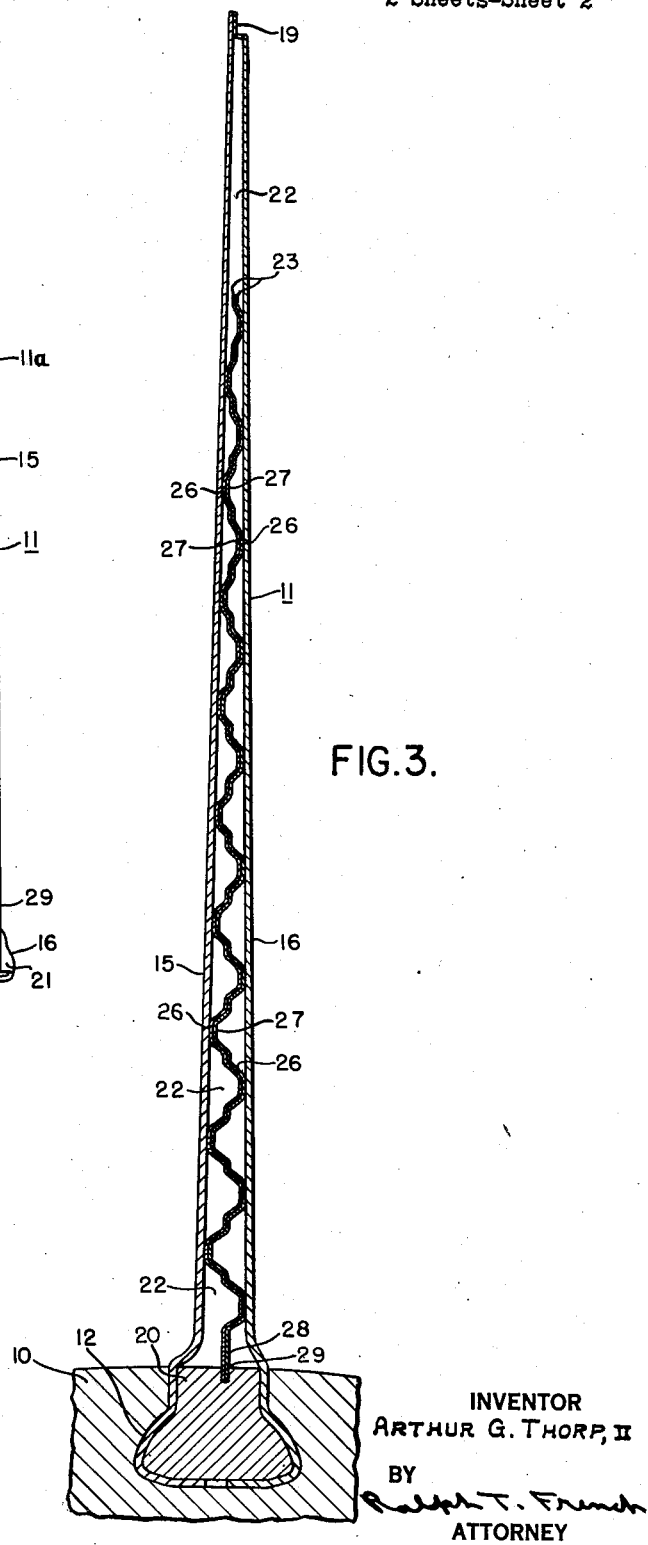
Fig. 3 is an enlarged detail sectional view taken along the line III—III of Fig. 2.

According to the invention, as best shown in Figs. 2 and 3, each blade unit 11 comprises an envelope or casing including curved halves or envelope portions 15 and 16 having complementary edges or abutting margins which are adapted to be brazed, or otherwise suitably secured together, to form leading and trailing edge joints 17 and 18 (see Fig. 2). One of the blade envelope halves may carry an offset tip portion for providing a wearing tip 19 for the blade unit, as shown in Fig. 3. The base or root portions of the blade halves 15 and 16 are spread outwardly and rounded to receive a core element 20, which thus constitutes a solid base for the root portion 11b engageable in the groove 12, as indicated in Fig. 1. Tab portions 21 are formed on the opposite ends of the respective blade halves, these tabs being folded about the ends of core element 20 and secured in abutting relation to facilitate formation of a strong joint that is continuous from the blade root to the blade tip, thereby ensuring uniform distribution of operational stresses and minimizing the effect of local strains induced by blade vibration.

As shown in Fig. 3, the curved blade halves 15 and 16 are tapered or inswept from root to tip to form an elongated internal space or chamber 22 which is widest near the root portion and relatively narrow adjacent the tip of the blade. Mounted within the chamber 22 are two interengaged complementary stampings or damper plates 23, which are similarly formed or crimped to provide a plurality of matching alternate bosses 26 and depressions 27 graduated in depth to correspond to the tapered blade halves, as best shown in Fig. 3. Preferably, the damper plates are pressed to the desired contours simultaneously, with a coating of graphite molybdenum disulphide, or other suitable lubricant interposed between the adjacent surfaces thereof to facilitate the operation. The damper plates 23 have suitable flanges 28 formed on the ends thereof adjacent the crimpings of maximum extent, for engagement in a groove 29 formed in the core element 20.

In assembling the improved blade unit 11, the inner surfaces of the blade halves are first coated or overlaid with suitable brazing material. With the loosely assembled damper plates and the attached core element interposed between the coated blade halves, in the manner disclosed in Fig. 4, the halves are then brazed together while clamped in a suitable holding device or jig (not shown). It will be understood that the abutting inner surfaces of the damper plates 23 will not be brazed together, but will remain in relatively free sliding engagement, while the outer boss portions 26 of each of the plates will on the other hand be brazed to the respective halves 15 and 16, the latter elements being secured together only at the margins thereof, as hereinbefore explained. The core element 20 is likewise brazed or otherwise suitably secured into the root portion 11b of the blade unit.

From the foregoing it will thus be seen that the improved blade unit may be constructed in any size desired, and particularly in larger sizes suitable for axial flow compressors of greater capacity than those heretofore employed in aviation gas turbine power plants, for example. Such a blade unit may readily be constructed at reasonable cost to exhibit favorable weight and strength characteristics, while affording ample rigidity and ability to damp any vibrations tending to develop during operation of the apparatus of which the blade forms a part. It will be understood that, with the slidably engaged interior damper plates individually secured to the respective halves of the assembled blade unit at the plurality of points provided by the bosses on the damper plates, damping of vibration will be ensured by the development of sliding friction between the nested plates incident to slight bending or distortion of the blade unit.

While the invention has been shown in but one form, it will be obvious to those skilled in the art that it is not so limited, but is susceptible of various changes and modifications without departing from the spirit thereof.

What is claimed is:

1. A fabricated blade unit for an axial-flow rotor comprising a pair of shallow halves having complementary edges engaging to form a hollow body, said halves forming an enlarged blade root portion, a core member contained in said root portion, and a pair of crimped loosely engaged damper plates extending from said core member and interleaved between said halves, the outer faces of said plates being secured to the adjacent halves, respectively, and the edges of said halves being secured together to provide a smooth exterior airfoil surface.

2. A blade unit as set forth in claim 1 wherein the ends of said damper plates are secured to said core member.

3. A blade unit as set forth in claim 1 wherein the elevations on said damper plates are correspondingly spaced and disposed in registration with each other, said elevations on the plates engaging the respective halves at a plurality of points.

4. A blade unit as set forth in claim 1 wherein the elevations on the damper plates are graduated in height from a maximum near the blade root to a minimum near the blade tip for preserving blade contour and minimizing panel vibration.

5. A blade unit as set forth in claim 1 characterized by provision of oppositely extending tabs on said root portions of the respective blade halves, said tabs being bent over the opposite ends of said core member into abutting relation to form a continuous joint from root to tip of both the leading and trailing edges of the fabricated blade unit for effecting uniform distribution of vibratory stresses.

ARTHUR G. THORP II.

References Cited in the file of this patent

UNITED STATES PATENTS

| Number | Name | Date |
|---|---|---|
| 2,559,131 | Oestrich et al. | July 3, 1951 |

FOREIGN PATENTS

| Number | Country | Date |
|---|---|---|
| 997 | Great Britain | 1887 |
| 10,918 | Great Britain | 1898 |